Andrews & Tucker.
Making Matches.
N°. 96,764. Patented Nov. 16, 1869.

Witnesses,
Henry C. Houston
Wm Franklin Seavey

Inventors:
Emery Andrews and
William Tucker
Per W. H. Clifford
atty

United States Patent Office.

EMERY ANDREWS, OF PORTLAND, MAINE, AND WILLIAM TUCKER, OF PHILADELPHIA, PENNSYLVANIA.

Letters Patent No. 96,764, dated November 16, 1869.

IMPROVEMENT IN MACHINE FOR MAKING MATCH-BLOCKS.

The Schedule referred to in these Letters Patent and making part of the same.

*To all whom it may concern:*

Be it known that we, EMERY ANDREWS, of Portland, in the county of Cumberland, and State of Maine, and WILLIAM TUCKER, of the city and county of Philadelphia, and State of Pennsylvania, have invented a new and useful Improved Notching-Machine; and we hereby declare the following to be a full, clear, and exact description thereof, which will enable others to make and use our invention, reference being had to the accompanying drawings, forming part of this specification, in which—

A is a section of the notcher.

Letters Patent of the United States have been granted to us for a match-machine, and the object of this invention is to prepare the match-cards, which are used in the manufacture of matches, on the said patented invention.

The operating-parts of our invention are set upon an appropriate frame, of such size as is convenient and necessary.

Set upon the said frame is a trough or box, $a$, which box encloses the saws and the notching-cylinder.

Set in the frame are the two shafts $c\ d$, to one of which is rigidly attached the notcher; to the other, the saws, as illustrated.

The saws $b\ b'$ are rigidly attached to the shaft $d$, which shaft is revolved by a band, gearing, or other well-known means.

They project up through slits on the sides of the trough $a$, above the top or table of the machine, to about half their diameter, so that when a card, equal in width to the width of the trough $a$, is passed along in said trough to the saws, the edges thereof will be cut by the saws, so that the card will be equal in width to the distance between the saws. These shafts are revolved by appropriate means.

The trough $a$, in front of the two circular saws, is filled with match-cards, of varying widths, greater than that which they are intended to have, after being notched, along the trough, until they reach the two circular saws $b\ b'$.

We do not herein claim any method of presenting the cards, either to the saws or to the notcher.

By these saws the cards are all cut to the same width. Passing from the saws, they are then submitted to the operation of the cylindrical notcher, by the operation of which a peculiar pointed and tapering shape is imparted to the end of the match, which is subsequently loaded with the igniting-substance.

The peculiar formation of the notcher A consists in longitudinal rows of projecting pointed teeth, the rows extending from one to the other end of the cylinder, and being placed as near together as convenient, or as practice may determine.

As the revolving notching-cylinder A comes in contact with the match-cards, which are driven along the trough, and into contact with the notcher, the action of the rows of projecting teeth thereon, is to chip out or remove from the end of the card certain portions of the substance thereof, corresponding in shape to the spaces between said teeth.

This operation of the notcher gives to the matches that peculiar tapering or pointed shape, alluded to above.

Figure 1:
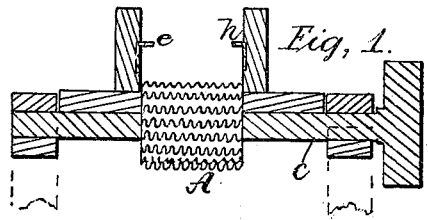
Figure 1 is a sectional detail, showing the notching-cylinder in full.
Figure 2:
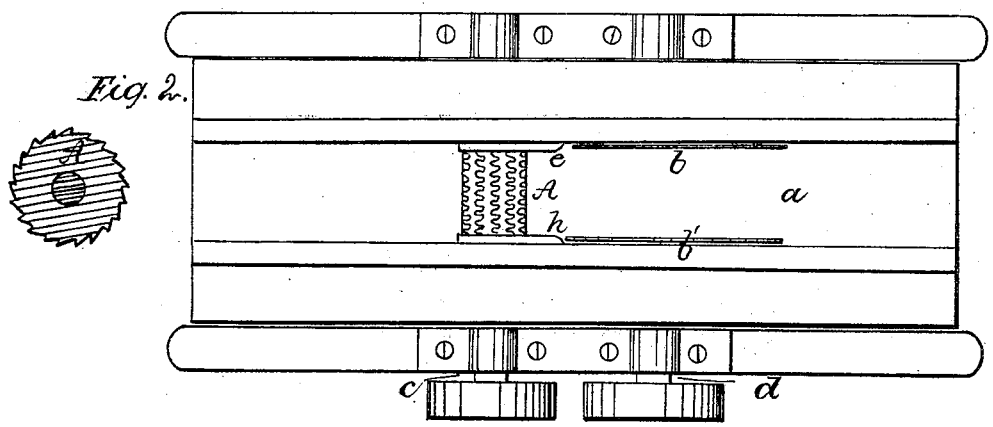
Figure 2 is a top plan of our machine.

A reference to fig. 1, of the drawings, will illustrate the shape of the teeth and intermediate spaces.

$e\ h$ show lips or shoulders on each side of the box or trough, immediately over the notching-cylinder.

As the cards pass in succession along through the box, their edges are caught by these lips, and kept in the proper position to be notched; that is to say, they are neither drawn down through the box nor forced up out of it by the action of the notcher, but are kept in the proper position relative to the cylinder.

What we claim as our invention, and desire to secure by Letters Patent, is—

The combination of the saws $b\ b'$, the notching-cylinder A in the trough $a$, operating as herein described, and either with or without the lips or shoulders $e\ h$, as herein set forth.

EMERY ANDREWS.
WILLIAM TUCKER.

Witness:
  GEO. ANDREWS.

Witnesses as to WILLIAM TUCKER:
  WM. B. DAYTON,
  THEO. SNELL.